(12) United States Patent
Falk et al.

(10) Patent No.: US 9,112,733 B2
(45) Date of Patent: Aug. 18, 2015

(54) MANAGING SERVICE LEVEL AGREEMENTS USING STATISTICAL PROCESS CONTROL IN A NETWORKED COMPUTING ENVIRONMENT

(75) Inventors: Walter Falk, Austin, TX (US); Donald W. Thomas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 12/951,338

(22) Filed: Nov. 22, 2010

(65) Prior Publication Data

US 2012/0131172 A1 May 24, 2012

(51) Int. Cl.
*H04L 12/26* (2006.01)
*G06F 11/34* (2006.01)
*H04L 12/64* (2006.01)
*H04L 12/24* (2006.01)

(52) U.S. Cl.
CPC ........ *H04L 12/6418* (2013.01); *H04L 41/0631* (2013.01); *H04L 41/5009* (2013.01); *H04L 41/5016* (2013.01); *H04L 41/5032* (2013.01)

(58) Field of Classification Search
CPC .............. H04L 12/24455; H04L 12/2464; H04L 12/2465; H04L 12/2467; H04L 12/2472; H04L 12/2474; H04L 41/50; H04L 41/5003; H04L 41/5009; H04L 41/5019; H04L 41/5025

See application file for complete search history.

(56) References Cited

U.S. PATENT DOCUMENTS

| | | | |
|---|---|---|---|
| 6,366,563 B1 | 4/2002 | Weldon et al. | |
| 6,880,002 B2 | 4/2005 | Hirschfeld et al. | |
| 7,120,694 B2 | 10/2006 | Sinha | |
| 7,536,370 B2 * | 5/2009 | Masurkar | 706/47 |
| 7,574,502 B2 | 8/2009 | Clymer et al. | |
| 7,782,786 B1 * | 8/2010 | Natarajan et al. | 709/224 |
| 8,429,097 B1 * | 4/2013 | Sivasubramanian et al. | 706/12 |
| 8,493,210 B2 * | 7/2013 | Maziak et al. | 709/203 |
| 8,713,163 B2 * | 4/2014 | Teather | 709/224 |
| 2003/0135609 A1 * | 7/2003 | Carlson et al. | 709/224 |
| 2005/0071458 A1 | 3/2005 | Fisher et al. | |
| 2008/0046266 A1 * | 2/2008 | Gudipalley et al. | 709/223 |
| 2008/0080396 A1 | 4/2008 | Meijer et al. | |
| 2009/0157441 A1 | 6/2009 | Curry | |

(Continued)

OTHER PUBLICATIONS

Patel, P. et al., "Service Level Agreement in Cloud Computing", Cloud Workshops at OOPSLA, Wright State University, Sep. 2009, pp. 1-10.

(Continued)

*Primary Examiner* — Patrice Winder
(74) *Attorney, Agent, or Firm* — William E. Schiesser; Keohane & D'Alessandro PLLC; Maxine L. Barasch (57) ABSTRACT

Embodiments of the present invention relate to the use of event processing (e.g., for complex events) in a cloud infrastructure using Statistical Process Control (SPC) techniques to detect changes in a holistic system. Specifically, events (e.g., complex events that occur over multiple layers in the architecture) may be detected and/or correlated by an event processor. Thereafter, an SPC engine will determine if the events impact a set of SLAs based on a set of Key Performance Indicators (KPIs), which are measurements indicating actual performance of the cloud computing environment versus stated goals. The SPC engine will then determine if a set of actions is needed to address the events to avoid the SLAs terms from not being met. If so, a provisioning engine can carry out any needed actions.

22 Claims, 5 Drawing Sheets

(56) References Cited

U.S. PATENT DOCUMENTS

| | | |
|---|---|---|
| 2009/0300210 A1 | 12/2009 | Ferris |
| 2010/0042720 A1 | 2/2010 | Stienhans et al. |
| 2010/0050172 A1 | 2/2010 | Ferris |
| 2010/0076856 A1 | 3/2010 | Mullins |
| 2010/0091671 A1* | 4/2010 | Lidstrom et al. ............. 370/252 |
| 2010/0153377 A1* | 6/2010 | Rajan et al. ................... 707/723 |
| 2010/0195496 A1* | 8/2010 | Holm-Oste et al. .......... 370/252 |
| 2010/0198972 A1 | 8/2010 | Umbehocker |
| 2010/0241903 A1* | 9/2010 | Goldszmidt et al. ............ 714/38 |
| 2010/0319004 A1* | 12/2010 | Hudson et al. ................ 719/313 |
| 2011/0016214 A1* | 1/2011 | Jackson ........................ 709/226 |
| 2011/0029882 A1* | 2/2011 | Jaisinghani .................. 709/223 |
| 2011/0029981 A1* | 2/2011 | Jaisinghani .................. 718/104 |
| 2011/0041126 A1* | 2/2011 | Levy et al. ......................... 718/1 |
| 2011/0219031 A1* | 9/2011 | Chi et al. ....................... 707/770 |
| 2011/0231899 A1* | 9/2011 | Pulier et al. ....................... 726/1 |
| 2012/0034916 A1* | 2/2012 | Hu et al. .................... 455/432.1 |
| 2012/0066020 A1* | 3/2012 | Moon et al. .................. 705/7.28 |

OTHER PUBLICATIONS

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages.

* cited by examiner

MANAGING SERVICE LEVEL AGREEMENTS USING STATISTICAL PROCESS CONTROL IN A NETWORKED COMPUTING ENVIRONMENT

TECHNICAL FIELD

The present invention generally relates to Service Level Agreement (SLA) management. Specifically, the present invention relates to the management of SLAs using statistical process control in a networked computing environment (e.g., a cloud computing environment).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, storage devices.

Managing performance oriented SLAs of cloud based operations is a relatively new problem has many technical and practical challenges. These challenges include ensuring customer satisfaction and avoidance unnecessary financial and economic costs. As an example, over-delivery of services typically equates to higher cost and resource usage than is required, while under-delivery often works to the detriment of the service provider. Typical solutions monitor for drop-offs in performance, but typically do not take proactive measures to prevent failure in meeting SLA terms.

SUMMARY

Embodiments of the present invention relate to the use of event processing (e.g., for complex events) in a cloud infrastructure using Statistical Process Control (SPC) techniques to detect changes in a holistic system. Specifically, events (e.g., complex events that occur over multiple layers in the architecture) may be detected and/or correlated by an event processor. Thereafter, an SPC engine will determine if the events impact a set of SLAs based on a set of Key Performance Indicators (KPIs), which are measurements indicating actual performance of the cloud computing environment versus stated goals. The SPC engine will then determine if a set of actions is needed to address the events to avoid the SLAs terms from not being met. If so, a provisioning engine can carry out any needed actions.

A first aspect of the present invention provides a method for managing Service Level Agreements (SLAs) using statistical process control in a networked computing environment, comprising: detecting events generated by resources of the networked computing environment; processing the events based on a set of Key Performance Indicators (KPIs) to determine if the events impact a set of SLAs; determining if a set of actions is needed to address the events to avoid the set of SLAs from not being met; and performing the set of actions as needed.

A second aspect of the present invention provides a system for managing Service Level Agreements (SLAs) using statistical process control in a networked computing environment, comprising: a bus; a processor coupled to the bus; and a memory medium coupled to the bus, the memory medium comprising instructions to: detect events generated by resources of the networked computing environment; process the events based on a set of Key Performance Indicators (KPIs) to determine if the events impact a set of SLAs; determine if a set of actions is needed to address the events to avoid the set of SLAs from not being met; and perform the set of actions as needed.

A third aspect of the present invention provides a computer program product for managing Service Level Agreements (SLAs) using statistical process control in a networked computing environment, the computer program product comprising a computer readable storage media, and program instructions stored on the computer readable storage media, to: detect events generated by resources of the networked computing environment; process the events based on a set of Key Performance Indicators (KPIs) to determine if the events impact a set of SLAs; determine if a set of actions is needed to address the events to avoid the set of SLAs from not being met; and perform the set of actions as needed.

A fourth aspect of the present invention provides a method for deploying a system for managing Service Level Agreements (SLAs) using statistical process control in a networked computing environment, comprising: deploying a computer infrastructure being operable to: detect events generated by resources of the networked computing environment; process the events based on a set of Key Performance Indicators (KPIs) to determine if the events impact a set of SLAs; determine if a set of actions is needed to address the events to avoid the set of SLAs from not being met; and perform the set of actions as needed.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to the use of event processing (e.g., for complex events) in a cloud infrastructure using Statistical Process Control (SPC) techniques to detect changes in a holistic system. Specifically, events (e.g., complex events that occur over multiple layers in the architecture) may be detected and/or correlated by an event processor. Thereafter, an SPC engine will determine if the events impact a set of SLAs based on a set of Key Performance Indicators (KPIs), which are measurements indicating actual performance of the cloud computing environment versus stated goals. The SPC engine will then determine if a set of actions is needed to address the events to avoid the SLAs terms from not being met. If so, a provisioning engine can carry out any needed actions.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
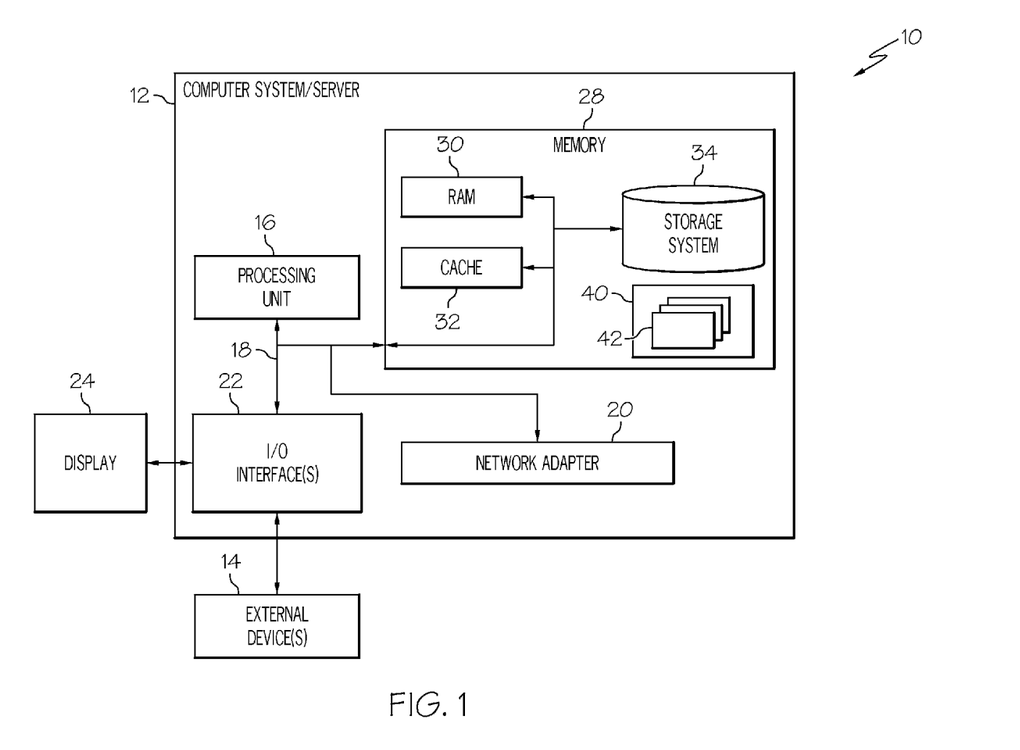
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
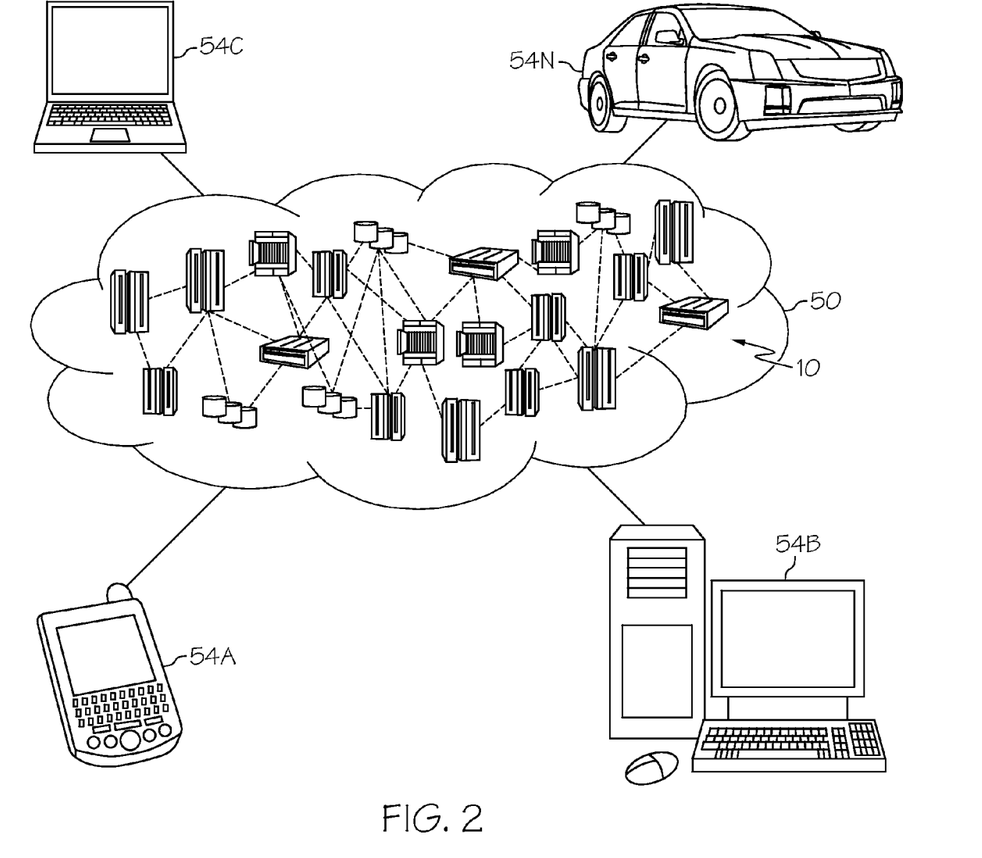
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
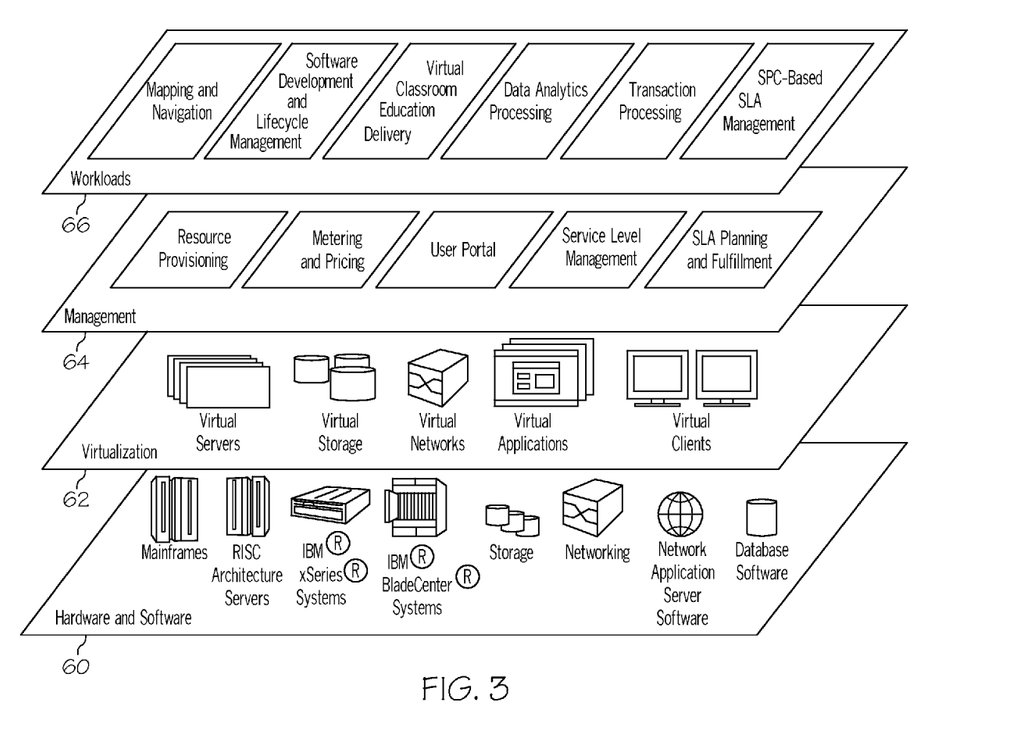
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Statistical Process Control (SPC)-Based SLA Management. As mentioned above, all of the foregoing examples described with respect to FIG. 3 are illustrative only, and the invention is not limited to these examples.

It is understood all functions of the present invention as described herein are typically performed by the SPC-Based SLA Management function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
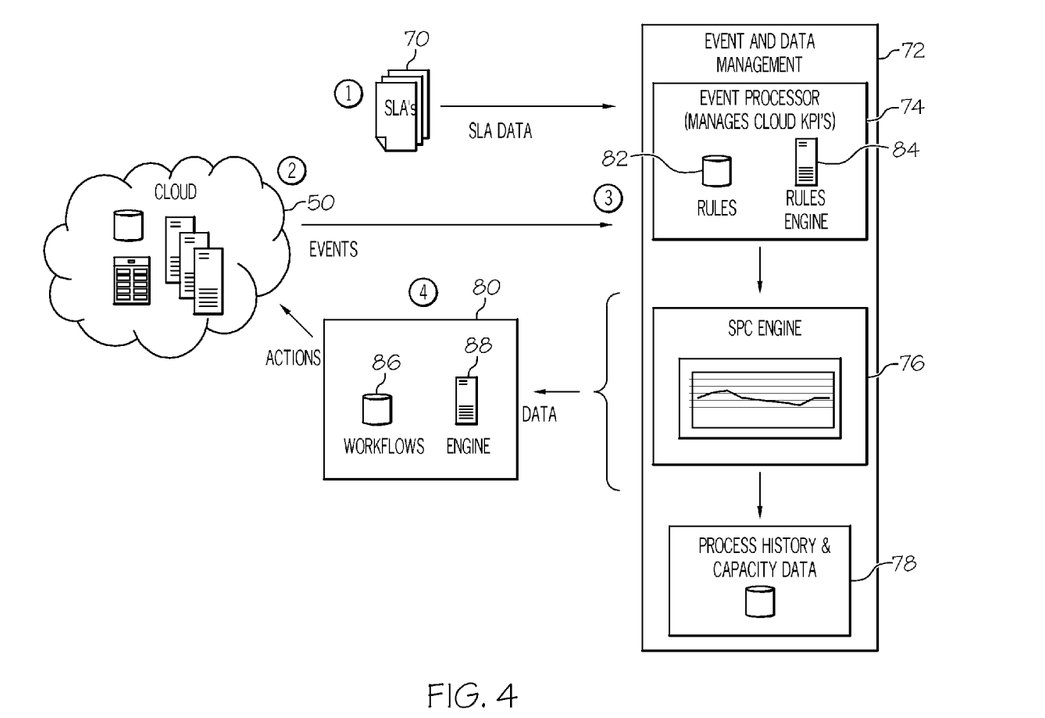
FIG. 4 depicts a component flow diagram according to an embodiment of the present invention.

Referring now to FIG. 4, a component flow diagram according to the present invention is shown. As depicted, SLAs 70 are defined and received by event and data management component 72. As events (e.g., complex events occurring over multiple levels of cloud environment 50) are gathered from cloud resources, rules engine 84 will utilize rules 82 to process and/or correlate events. Specifically, event processor 74 will process the events to determine if the events impact a set of SLAs based on a set of Key Performance Indicators (KPIs). In general, KPIs are used to evaluate the performance of processes against operational goals, such as those set forth in the SLAs. KPIs are typically selected based on mutually agreed upon goals for an organization or a customer and a provider. A further description of KPIs will be set forth below.

Once the events have been processed and a potential shortfall of performance versus goals has been identified, Statistical Process Control (SPC) engine 76 will determine if a set of remedial actions is needed to address the events to avoid the set of SLAs from not being met. Along these lines, SPC engine 76 can receive data and/or rules from event processor 74. In addition, SPC engine 76 can access process history and capacity data 78 to verify whether any proposed remedial actions would exceed capacity (e.g., of one or more levels of cloud environment 50) or other terms of service (e.g., other SLAs). Once such verification has been performed, provisioning engine 80 may leverage workflows 86 and workflow engine 88 to provision any needed resources or take any necessary action. In a typical embodiment, SPC engine 76 takes incoming KPI data and attempts to distinguish unnatural patterns from natural patterns based on rules that are set. Pre-control limits can be selected (also called Narrow-Limit Gauging) for well understood processes. Western Electric Rules or customized rules for detecting process changes can also be utilized. Once a process change is detected, an event can be created to trigger corrective action. In general, Western Electric rules attempt to distinguish unnatural patterns from natural patterns based on several criteria: the absence of points near the centerline (identified as a mixture pattern); the absence of points near the control limits (identified as a stratification pattern); the presence of points outside the control limits (identified as an instability pattern); and/or other unnatural patterns (systematic (autocorrelative), repetition, trend patterns). To achieve this, the rules divide the chart into zones, measured in units of standard deviation between the centerline and control limits.

To describe the above process in more detail, the following steps can be performed in advance and/or as the process is being performed:

Define data gathering period for process baseline: Data is gathered during an observation period in order to set a baseline. Outliers can be excluded during this exercise. Once the baseline is set, the process can begin. This process can be repeated throughout the life span (weekly, monthly, or when a known cause of deviation is introduced) of the SLA(s) and should be automated as an ongoing calibration for maximum effect.

Define complex event triggers: By defining known interactions of events that identify known issues within the overall system, issues and problems can be more proactively handled.

Define process control rules: Once the process begins, process control rules are used and incoming data points are evaluated. In one embodiment, Western Electric rules, Pre-Control rules for well understood processes, or a custom set of rules can be implemented.

Define actions (can be simple alerts or automated actions) to be taken in reaction to trigger: If the service levels are drifting below desired SLA targets, action may be taken in order to improve the service levels, such as dedicating more resource to the service. If the service levels are drifting above desired SLA targets, it may be determined to relocate more resource to other services.

In generating the KPIs, the following guidelines could be introduced:

There can be capacity and Quality of Service) QoS parameters at each cloud service level (Infrastructure as a Service (IaaS), Process as a Service (PaaS), Business Process as a Service (BPaaS) . . . )

KPIs can be defined per workload that the cloud is providing. Examples:
Pure IaaS services: CPU, memory, storage and network could be defined
SaaS: Software license capacity and response time would be measured
Retail Payment Gateway: payment transaction times
Order Entry Service: Graphical User Interface (GUI) response time, concurrent transaction limit
Business Analytics: Analytic CPU capacity, free storage Cloud services can be defined at different levels and KPIs can be defined within or across these levels, for examples:
Storage: Cloud Storage Availability and Access Time
Compute Resources: Virtual Machine Availability and Utilization
Application Resources: Cloud Application Services Availability and Response Time
Users: End-User Service Requests and Response Time The concepts illustrated above, will be further described in conjunction with the following illustrative examples:

Illustrative Example I

1. A provider delivers payment processing as a service. The provider guarantees two second processing time for confirming payment funds.
2. Key event sources are defined as a transaction time for third party funding verification and CPU usage for the payment service.
3. The following rules are defined:
    1. If CPU usage >70%, the provision a new server
    2. If statistical process control trending rules indicate that trending towards longer provisioning times, then provision a new server
4. The process runs, SPC engine 76 detects seven data points in a row trending towards longer third party funding verification times, but still within control limits.
5. A rule is defined that triggers provisioning of an additional payment processing server based on payment transaction processing time being exceeded.
6. An additional payment processing server is provisioned.

Illustrative Example II

1. A pharmaceutical company balances R&D processing with general IT resources. The company desires to shift processing power to background Research and Development (R&D) calculations whenever Information Technology (IT) services are within process guidelines
2. A key event problem source is defined as Service Desk User Interface (UI) response time.
3. The following rules are defined:
    1. If response time for process capability (Cp)>2.0 and no process control limits are exceeded, the reallocate servers to R&D calculations.
    2. If response time Cp<=1.5 and any process control limit violations, reallocate servers to Service Desk UI.
4. As the process runs, SPC engine 76 detects Cp is now at 2.02 and a server is repurposed to run R&D calculations.
5. If Cp continues >2.0, more servers can be repurposed.
6. If Cp drops to 1.5 or below, servers are repurposed for the Service Desk UI.

Figure 5:
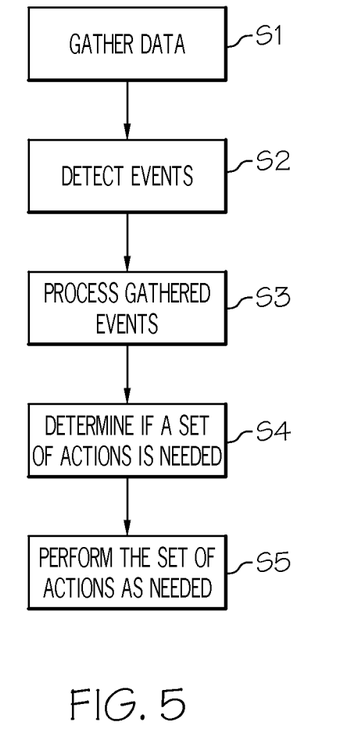
FIG. 5 depicts a method flow diagram according to the present invention.

Referring now to FIG. 5, a method flow diagram according to the present invention is shown. As depicted, in step S1, SLA data s gathered. In step S2, events generated by resources of the networked computing environment are detected. In step S3, the events are processed, based on a set of Key Performance Indicators (KPIs), to determine if the events impact a set of SLAs. In step S4, it is determined if a set of actions is needed to address the events to avoid the set of SLAs from not being met. In step S5, the set of actions is performed as needed.

While shown and described herein as a SPC-based SLA management solution, it is understood that the invention further provides various alternative embodiments. For example, in one embodiment, the invention provides a computer-readable/useable medium that includes computer program code to enable a computer infrastructure to provide SPC-based SLA management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide SPC-based SLA management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for SPC-based SLA management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing Service Level Agreements (SLAs) using statistical process control in a networked computing environment, comprising:
    detecting events generated by resources of the networked computing environment, the detecting comprising at least one of:
        detecting an absence of points near a baseline,
        detecting an absence of points near control limits, and
        detecting a presence of points outside of the control limits;
    processing the events based on a set of Key Performance Indicators (KPIs) to determine if the events impact a set of SLAs;
    determining if a set of remedial actions is needed to address the events to avoid the set of SLAs from being not being met;
    verifying whether the set of remedial actions would exceed a capacity of at least one of: a level of a cloud environment, and terms of service; and
    performing the set of remedial actions as needed if the set of remedial actions does not exceed the capacity of either of: the level of the cloud environment, and the terms of service.

2. The method of claim 1, further comprising determining if performance of the set of remedial actions will cause capacity issues in the networked computing environment.

3. The method of claim 1, the set of KPIs being defined per workload.

4. The method of claim 1, the events being complex events from multiple layers of architecture in the networked computing environment, and the method further comprising correlating the complex events.

5. The method of claim 1, the networked computing environment being a cloud computing environment.

6. The method of claim 1, the KPIs measuring performance against goals for the networked computing environment.

7. The method of claim 1, the verification being based on process history and capacity data.

8. A system for managing Service Level Agreements (SLAs) using statistical process control in a networked computing environment, comprising:
    a bus;
    a processor coupled to the bus; and
    a memory medium coupled to the bus, the memory medium comprising instructions to:
        detect events generated by resources of the networked computing environment, the detecting comprising at least one of:
            detecting an absence of points near a baseline,
            detecting an absence of points near control limits, and
            detecting a presence of points outside of the control limits;
        process the events based on a set of Key Performance Indicators (KPIs) to determine if the events impact a set of SLAs;
        determine if a set of remedial actions is needed to address the events to avoid the set of SLAs from not being met;
        verify whether the set of remedial actions would exceed a capacity of at least one of: a level of a cloud environment, and terms of service; and
        perform the set of remedial actions as needed if the set of actions does not exceed the capacity of either of: the level of the cloud environment, and the terms of service.

9. The system of claim 8, the memory medium further comprising instructions to determine if performance of the set of remedial actions will cause capacity issues in the networked computing environment.

10. The system of claim 8, the set of KPIs being defined per workload.

11. The system of claim 8, the events being complex events from multiple layers of architecture in the networked computing environment, and the memory medium further comprising instructions to correlate the complex events.

12. The system of claim 8, the networked computing environment being a cloud computing environment.

13. The system of claim 8, the KPIs measuring performance against goals for the networked computing environment.

14. The system of claim 8, the verification is based on process history and capacity data.

15. A computer program product for managing Service Level Agreements (SLAs) using statistical process control in a networked computing environment, the computer program product comprising a computer readable storage media, and program instructions stored on the computer readable storage media, to:
    detect events generated by resources of the networked computing environment, the detecting comprising at least one of:
        detecting an absence of points near a baseline,
        detecting an absence of points near control limits, and
        detecting a presence of points outside of the control limits;

process the events based on a set of Key Performance Indicators (KPIs) to determine if the events impact a set of SLAs;
determine if a set of remedial actions is needed to address the events to avoid the set of SLAs from not being met;
verify whether the set of remedial actions would exceed a capacity of at least one of:
a level of a cloud environment, and terms of service; and
perform the set of remedial actions as needed if the set of actions does not exceed the capacity of either of: the level of the cloud environment, and the terms of service.

16. The computer program product of claim 15, the memory medium further comprising instructions to determine if performance of the set of remedial actions will cause capacity issues in the networked computing environment.

17. The computer program product of claim 15, the set of KPIs being defined per workload.

18. The computer program product of claim 15, the events being complex events from multiple layers of architecture in the networked computing environment, and the memory medium further comprising instructions to correlate the complex events.

19. The computer program product of claim 15, the networked computing environment being a cloud computing environment.

20. The computer program product of claim 15, the KPIs measuring performance against goals for the networked computing environment.

21. The computer program product of claim 15, the verification is based on process history and capacity data.

22. A method for deploying a system for managing Service Level Agreements (SLAs) using statistical process control in a networked computing environment, comprising:
deploying a computer infrastructure being operable to:
detect events generated by resources of the networked computing environment, the detecting comprising at least one of:
detecting an absence of points near a baseline,
detecting an absence of points near control limits, and
detecting a presence of points outside of the control limits;
process the events based on a set of Key Performance Indicators (KPIs) to determine if the events impact a set of SLAs;
determine if a set of remedial actions is needed to address the events to avoid the set of SLAs from not being met;
verify whether the set of remedial actions would exceed a capacity of at least one of: a level of a cloud environment, and terms of service; and
perform the set of remedial actions as needed if the set of actions does not exceed the capacity of either of: the level of the cloud environment, and the terms of service.

\* \* \* \* \*